United States Patent [19]

Garrett

[11] 4,246,843
[45] Jan. 27, 1981

[54] METHOD FOR TREATING IMAGED LITHOGRAPHIC PRINTING PLATES

[75] Inventor: Walter L. Garrett, Midland, Mich.

[73] Assignee: The Dow Chemical Company, Midland, Mich.

[21] Appl. No.: 901,377

[22] Filed: May 1, 1978

Related U.S. Application Data

[62] Division of Ser. No. 708,233, Jul. 23, 1976, Pat. No. 4,143,021.

[51] Int. Cl.$^3$ .............................................. B41M 1/06
[52] U.S. Cl. .................................. 101/451; 101/457; 101/465; 106/2; 260/29.6 E
[58] Field of Search .................... 106/2; 101/453, 457, 101/462, 465, 451; 260/29.6 E

[56] References Cited

U.S. PATENT DOCUMENTS

| | | | |
|---|---|---|---|
| 3,547,632 | 12/1970 | Nadeau | 106/2 |
| 3,745,028 | 7/1973 | Rauner | 101/465 |
| 3,829,319 | 8/1974 | Suzuki et al. | 106/2 |
| 4,116,896 | 9/1978 | Garrett et al. | 260/29.6 E |

*Primary Examiner*—Lorenzo B. Hayes
*Attorney, Agent, or Firm*—Burke M. Holldorson; Glenn H. Korfhage

[57] ABSTRACT

A method for treating imaged lithographic printing plates with a solution comprising (1) water, (2) an active polymer component for rendering non-image areas of a lithographic printing plate hydrophilic, comprised of a polyacrylamide-based polymer or copolymer or a blend of polyacrylamide and polyacrylic acid, or the like, said polymer or copolymer or blend having an average molecular weight of from about 5,000 to about $10^6$ and having from about 3 to about 70 percent of the carbonyl sites as carboxyl groups, said active polymer component being present in an amount of from about 3 to about 30 weight percent of active polymer component, based on the weight of the active polymer component and the water, and (3) a suitable polyoxyalkylene glycol in an amount which is effective to reduce tackiness while the composition is drying and which does not adversely affect the printing properties of a plate treated with said composition, said polyoxyalkylene glycol being selected from the group consisting of (a) a polyethylene glycol with an average molecular weight of about 200 to about 800; (b) a polypropylene glycol with an average molecular weight of about 200 to about 600; (c) a mixture of components from (a) and (b); (d) a triether of glycerine with a mixture of polypropylene and polyethylene oxides; and (e) a triether of glycerine with polypropylene oxides. The solution is particularly suited for treating imaged lithographic printing plates since, unlike earlier solutions, it does not go through a tacky state when drying.

36 Claims, No Drawings

METHOD FOR TREATING IMAGED LITHOGRAPHIC PRINTING PLATES

CROSS REFERENCE TO RELATED APPLICATION

This is a division, of application Ser. No. 708,233 Filed July 23, 1976, now U.S. Pat. No. 4,143,021.

BACKGROUND OF THE INVENTION

1. Field of the Invention

The invention relates to an improved composition suitable for use as a desensitizing solution in treating image-bearing lithographic printing plates, a method for treating such plates employing the improved composition, and a plate treated with the improved composition. The improvement comprises employing a polyoxyalkylene glycol in the old composition to prevent a tacky stage from occurring as the treated plate is dried.

2. Description of the Prior Art

Lithographic printing plates on which an image has been exposed and developed, referred to as "imaged" plates, must be treated with a natural or synthetic desensitizing gum before being stored or used. One such synthetic desensitizing gum is described in the U.S. Patent application by Walter L. Garrett et al., Ser. No. 586,455, filed June 12, 1975, entitled "Method of Treating Image-Bearing Lithographic Plates", which is a continuation-in-part of Ser. No. 565,915, filed Apr. 7, 1975, both of which are now abandoned. Said Ser. No. 586,455 and its teachings are hereinafter referred to as "Garrett I". The gum is applied to the plate in an aqueous solution, which is normally wiped dry before the plate is stored or used. Although the synthetic gum of Garrett I is believed to represent a significant development in the art, it suffers from one disadvantage in that when using gums of the type described in Garrett I, tackiness occurs in the final drying stage of the gummed plates. Attempts to rub the plate dry in this stage can result in scuffing of the polymeric coating, which results in sensitized spots on the plate and later leads to scumming on the printed sheets. Plates treated with the original composition of Garrett I therefore could not readily be stored without a long drying period or, alternatively, forced drying as with a fan. Accordingly, a synthetic desensitizing solution was needed which would retain the desensitizing properties and other advantages of the synthetic gum, but which would not have a tacky drying stage.

It is known in the art to use polyethylene glycol in a fountain solution of a lithographic press to prevent the lithographic plate from picking up lint from the paper as it is printed. However, it is believed it has heretofore not been known to include polyglycols in the plate desensitizing solution, where lint is not a problem.

DEFINITION OF TERMS

The term "active polymer component(s)" refers to that component of the solution which is responsible for the desensitizing properties of the gumming solution. It means in a generic sense any one or more of the members (a) through (e) of the group consisting of (a) a polyacrylamide-based polymer wherein from about 3 to about 70 percent of the carbonyl sites are carboxyl groups, and the balance of said sites are amide moieties;

(b) a physical blend comprised of from about 97 to about 30 weight percent polyacrylamide and from about 3 to about 70 weight percent polyacrylic acid or an alkali metal or ammonium salt thereof;

(c) a physical blend comprised of polyacrylamide, or polyacrylic acid or an alkali metal or ammonium salt thereof, and at least one polyacrylamide-based polymer as described in (a), said polymers being employed in proportions such that of the total carbonyl sites present in the blend, from about 3 to about 70 percent are carboxyl groups and the balance are amide moieties;

(d) a mixture of any two or more of the foregoing; or (e) a mixture of any one or more of the foregoing with up to about 30 weight percent hydroxypropyl methylcellulose, based on the total weight of the co-mixture, said hydroxypropyl methylcellulose being of a type which produces a 2 weight percent aqueous solution having a viscosity of from about 1 to about 100 cP when measured according to ASTM Method D 2363-72.

The average molecular weight of each of the polyacrylamide-based polymer, the polyacrylamide, and the polyacrylic acid or salt thereof is about 5,000 to 1,000,000. The particular method by which the polyacrylamide-based polymer is prepared is not critical. Included within the definition are polymers formed by copolymerization of acrylamide and acrylic acid, or salts thereof, in proportions and conditions such that, of the carbonyl sites in the resulting copolymer, from about 3 to about 70 percent are carboxyl groups. Alternatively, polyacrylamide-based polymer may be obtained by hydrolysis of polyacrylamide. A solution of active polymer component in the water of the composition should contain from about 3 to about 30 weight percent active polymer component. The term does not include the polyglycol.

The term "carboxyl group(s)" refers to the moiety

wherein M is a hydrogen, alkali metal, or ammonium ion.

"Desensitization" refers to the depositing in the non-image areas of the plate an adequate protective film of a hydrophilic substance to prevent the plate from picking up ink in such areas from the inking roller during printing, or, during screening tests, from retaining ink from a sponge or a tissue wiped across the plate surface.

"Scumming" refers to a condition that exists on the printing plate or results in the printed image when the water receptive areas of the printing plate become at least partially ink-receptive.

The abbreviation "cP" refers to the viscosity unit, centipoise. Unless otherwise specified, all viscosity measurements were made at ambient temperature using a Brookfield viscometer. Spindle sizes of 1-4 were employed in rotations of from 6 to 60 revolutions per minute, as appropriate for each particular solution.

The term "image" refers to the hydrophobic, oleophilic, ink-receptive areas of a lithographic plate produced, for example, on development of a photolithographic plate following exposure to actinic radiation.

Average molecular weights of active polymer component samples were determined by measuring viscosities of 1 percent aqueous solution of the active polymer component. At lower molecular weights, gel permeation chromatography was also used. Calibration standards for these measurements were obtained by measuring higher molecular weights using well-known light scattering methods, plotting log(molecular weight) versus log(viscosity) and log(molecular weight) versus gel permeation chromatography retention volume, and extrapolating to the lower molecular weight ranges.

"Polyoxyalkylene glycol" refers to any polymer consisting essentially of alkylene units connected by oxide linkages, and terminating in two or more hydroxyl (—OH) groups. It includes triethers of glycerine with polyalkylene oxides, such as:

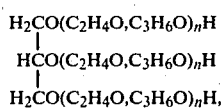

where n may be any integer greater than 1. This triether may also be described as a polyoxyalkylene ether containing methyl side chains and terminal hydroxyl groups, or as a polyoxyalkylene glycerol.

SUMMARY OF THE INVENTION

It has now been discovered that the tackiness encountered in the final drying stage of synthetic desensitizing gum solutions of the type hereinabove described can be reduced or even eliminated by the use of an additional component in the desensitizing solution. Accordingly, one aspect of the invention is an improved composition, suitable for use as a desensitizing gum for treating imaged lithographic printing plates, comprising water, an active polymer component in an amount of from about 3 to about 30 weight percent, based on the weight of the active polymer component and the water, as hereinabove defined, for rendering non-image areas of a lithographic plate hydrophilic, and a suitable polyoxyalkylene glycol in an amount which is effective to reduce tackiness while the composition is drying and which does not adversely affect the printing properties of a plate treated with said composition, said polyoxyalkylene glycol being selected from the group consisting of (a) a polyoxyethylene glycol with an average molecular weight of about 200 to about 800; (b) a polyoxypropylene glycol with an average molecular weight of about 200 to about 600; (c) a mixture of components from a and b; (d) a triether of glycerine with a mixture of polypropylene and polyethylene oxides and (e) a triether of glycerine with polypropylene oxides.

FURTHER DESCRIPTION OF THE INVENTION

The quality of the plates protected by desensitizing gum solutions of Garrett I is not impaired by including with the gum solution any of the polyglycols evaluated, with the exception of those cases (noted below) where the polyglycol exhibits solvent effect on the developer pigment. In addition to eliminating tackiness, a further advantage of adding polyglycol is that the image areas of plates so protected accept ink faster than those without the polyglycol. This is especially true of the polyoxyalkylene glycerol, making the use of it the best mode presently contemplated for practicing the invention.

When polyoxyalkylene glycol is added to the active polymer component solution in an amount of about 1 percent or more, the drying stage is much less sticky than without the polyoxyalkylene glycol. The degree of tackiness during drying decreases as the amount of polyoxyalkylene glycol is increased to about 5 percent, at which point virtually no tackiness is observed. Higher concentrations of polyoxyalkylene glycol have no noticeable additional effect, but it is shown that a concentration of at least about 10 percent effectively eliminates the tackiness, without adversely affecting the desensitizing properties.

Polyoxyalkylene glycols are not by themselves desensitizing agents, so addition of a polyglycol effectively reduces the concentration of desensitizing gum. Therefore, it is advisable to keep the concentration in the solution as low as possible, to prevent interference with the desensitizing action of the active polymer component.

The average molecular weight of a polyoxyalkylene glycol affects the degree to which tackiness is reduced, as for example, a polyoxypropylene glycol with an average molecular weight of about 400 is more effective than one with an average molecular weight of about 250. With polyoxyethylene glycol, an average molecular weight of about 600 is more effective than an average molecular weight of about 300.

Polyoxypropylene glycols impart a haze to the resulting solution. While this has little, if any, effect on the quality of the printing, such a haze may be somewhat undesirable in some applications; for example, it could clog feed lines if the solution is used in an automated plate processing apparatus.

Polyoxypropylene glycols are effective to reduce tackiness when the average molecular weight is at least about 200. However, when the concentration of polyoxypropylene glycol with an average molecular weight of about 400 is 10 percent or more, the polyoxypropylene glycol exhibits a slight amount of solvent effect on the developer pigment. That is, it begins to dissolve the image, so that the image areas of the plate will no longer accept ink. The use of a polyoxypropylene glycol, with a high enough average molecular weight that solvent effect can occur, in such a concentration that any solvent effect does occur is not considered to be a part of the present invention. The amount of solvent effect increases as the molecular weight of a polyoxypropylene glycol is increased. With an average molecular weight of about 600, polyoxypropylene glycol can still be used in an effective concentration without showing solvent effect. Higher molecular weight polyoxypropylene glycols, e.g., an average molecular weight of greater than about 800 show considerably more solvent effect, so solutions containing these polyoxyalkylene glycols are not usable at any concentration.

Polyoxyethylene glycols with an average molecular weight of at least about 200 are effective as additives to synthetic gum to provide compositions which are not tacky when drying. The upper molecular weight is not critical except that the molecular weight should not be so high that it is difficult to dissolve the polyglycol nor that the viscosity of the resulting solution is significantly affected. Preferably the average molecular weight of the polyoxyethylene glycol is from about 300 to about 600. As with polyoxypropylene glycols, usable concentrations are at least about 1 percent by weight of the other components, with about 5 percent preferred. No solvent effect was noted at any concentration of the polyoxyethylene glycol, so the only constraints on the maximum concentration which may be used are the effective reduction in concentration of the active polymer component and the possible effects on the viscosity of the solution. The solutions containing polyoxyethylene glycol are clear, and thus are preferable to solutions containing the polyoxypropylene glycol.

A mixture of a polyoxyethylene glycol and a polyoxypropylene glycol may also be effectively employed with the active polymer component to prevent tackiness from occurring as the treated plate is drying. The same limitations as to operative and preferred molecular weights are applicable to each of the polyoxyethylene and polyoxypropylene when the two are used in admixture as when each is used separately. Since the required concentrations for the two types of polyoxyalkylene glycols are substantially the same, the amount of the mixture of the two required for the solution to be effective is at least about 1 percent with about 5 percent preferred.

Inclusion in the desensitizing gumming solution of a triether of glycerine with polypropylene oxides produces results which vary considerably with the molecular weight of the particular triether employed. At an average molecular weight of about 200, the solution is clear and tackiness is reduced or eliminated. As the molecular weight of the triether approaches about 750, the solution is cloudy, but tackiness is reduced or eliminated, and plate quality is not affected. However, when the average molecular weight is greater than about 1,000, the triether begins to exhibit solvent effect on the developer pigment when employed at an effective concentration, and is therefore not suitable in the invention.

The best results are obtained using a triether of glycerine with a mixture of polypropylene and polyethylene oxides, since a triether of this type noticeably increases the oleophilicity (ink-receptance) of a treated plate, in addition to eliminating tackiness. Preferably, said triether has an average molecular weight of from about 2,000 to about 3,000, and more preferably about 2,500. An example of such a triether of glycerine is Polyglycol 15-200, available as an article of commerce from The Dow Chemical Company, Midland, Michigan. This polyoxyalkylene ether containing methyl side chains and terminal hydroxyl groups is effective in concentrations of at least about 1 percent. Preferably, it is added at about a 5 percent concentration.

The active polymer component formulations to which the polyoxyalkylene glycols may be added to form the presently claimed composition are described in Garrett I. Garrett I teaches, for use as desensitizing solutions, a combination composed of water and one of the following (a) through (e):

(a) a polyacrylamide-based polymer wherein from about 3 to about 70 percent of the carbonyl sites are carboxyl groups, and the balance of said sites are amide moieties;

(b) a physical blend comprised of from about 97 to about 30 weight percent polyacrylamide and from about 3 to about 70 weight percent polyacrylic acid or an alkali metal or ammonium salt thereof;

(c) a physical blend comprised of polyacrylamide, or polyacrylic acid or an alkali metal or ammonium salt thereof, and at least one polyacrylamide-based polymer as described in (a), said polymers being employed in proportions such that of the total carbonyl sites present in the blend, from about 3 to about 70 percent are carboxyl groups and the balance are amide moieties;

(d) a mixture of any two or more of the foregoing group members (a) through (c) or (e) a mixture of any one or more of the foregoing group members (a) through (d) with up to about 30 percent by weight hydroxypropyl methylcellulose, based on the total weight of the co-mixture, said hydroxypropyl methylcellulose being of a type which produces a 2 weight percent aqueous solution having a viscosity of from about 1 to about 100 cP when measured according to ASTM Method D 2363-72.

The average molecular weight of each of the polyacrylamide-based polymer, the polyacrylamide, and the polyacrylic acid or salt thereof is about 5,000 to 1,000,000.

It is taught that the particular method by which the polyacrylamide-based polymer is prepared is not critical, nor is it necessary that the active polymer component be a single polymeric substance, so long as carboxyl groups constitute from about 3 to about 70 percent of the carbonyl sites, and the average molecular weight of the polymer is from about 5,000 to about 1,000,000.

Included in the examples are instances where the percentage of the active polymer component in the solution before addition of the polyglycol is as high as 10 percent, and good results are obtained with as much as 30 percent. The lower effective limit appears to be about 3 percent. When used in the present invention, the active polymer component is effective in desensitizing the plates when acrylic acid moieties make up from about 3 percent to about 70 percent of the carbonyl sites in said active polymer component. This is equivalent to the statement that from about 3 percent to about 70 percent of the carbonyl sites may be occupied by carboxyl groups. Preferably, from about 10 percent to about 25 percent of the carbonyl sites in the active polymer component are occupied by carboxyl groups. While the average molecular weight of the active polymer component can range from about 5,000 to about 1,000,000, in the present invention an average molecular weight of from about 175,000 to about 250,000 is preferred.

Garrett I teaches that an active polymer component so formulated may be used in several different solutions, such as straight gum, gum etch and fountain solutions. The present invention may be advantageously employed with either a straight gum or a gum etch solution.

A straight gum solution can be used to desensitize a plate after the plate has been exposed and developed, or after the plate has been cleaned with a plate cleaning etch containing no desensitizing gum. It can also be used to treat a plate for storage. The concentration of active polymer component in a conventional straight gum solution may be from about 3 to about 30 weight percent, but those skilled in the art will recognize that, within this range, the quantity of active polymer component employed should be such that the viscosity of the solution is from about 40 to about 1,000 cP, in order to obtain a uniform film on the plate. Thus the preferred concentration of active polymer component is about 3 to 12 percent.

Gum etch solutions, either acidic or alkaline, can be used in lieu of a straight gum solution to desensitize a plate after the plate has been exposed and developed, or to desensitize a plate after it has been cleaned or to apply a protective coating prior to storage. A gum etch solution contains a desensitizing gum, the distinction between a gum etch and a straight gum being that the former can be used to clean a scummed plate, thereby reducing to one step the two step procedure of cleaning and thereafter regumming. The acidic gum etch type solution contains phosphoric acid and is characterized by a pH of from about 1 to about 3, whereas the alkaline gum etch type solution contains at least one alkaline metal or ammonium phosphate and is characterized by a pH of from at least about 9 to about 12.5. The teachings above as to the solution viscosity and concentration of the active polymer component are likewise applicable to gum etch solutions. The viscosity of the solution should be from about 40 to about 1,000 cP, and the preferred concentration of active polymer component is about 3 to 12 percent.

A straight gum or a gum etch solution containing about 10 percent of an active polymer component comprising about 25 percent acrylic acid moieties and about 75 percent acrylamide moieties with an average molecular weight of about 250,000, for example, is effective in gumming and desensitizing a lithographic plate, and allows storage of the plate for up to about 3 months, with no deterioration of the plate surface. Likewise, a 3.25 percent aqueous solution of an active polymer component made up of about 12 percent acrylic acid moieties, with an average molecular weight of about 250,000 is also effective. When an effective amount of a polyoxyalkylene glycol of the invention is added to such a solution, there is no decrease in plate quality, and there exists little or no tackiness during the drying of the polymeric film. Additionally, the image areas of plates treated with a solution containing polyglycol are more oleophilic than prior plates. That is, the ink is accepted faster in the image areas of the plate. This is advantageous in that start up of the press is faster, resulting in less off-grade material when a press run is started. Thus, the invention includes plates treated with the composition herein described, as a plate so treated is a new article which represents an advance over the prior art.

EXAMPLES

The invention and its advantages over the invention described in Garrett I may be illustrated by the following comparison runs and non-restrictive examples, which are collected in the accompanying table. For each run, one or more brush grained aluminum plates 0.012 inch in thickness were cut in test coupons 2.5 inches by 4.5 inches or larger. The invention can also be practiced, however, using anodized aluminum plates, copperized aluminum plates or trimetal chromium/copper/aluminum, as well as offset master plates of steel, aluminum, or those having zinc oxide/resin binder or titanium dioxide/resin binder surfaces. A diazo coating composed of p-diazo diphenylamine and formaldehyde was applied uniformly to the plate with a moist sponge and the film dried in a hot air stream. A 65 screen combination half-tone and line copy negative was placed on the coated plate. The combination was placed in a vacuum frame and exposed to a mercury arc 5 KW UV lamp at a distance of 38 inches for 40 seconds. The imaged plates were developed using Sure Dot brand developer. Both the diazo coating and the developer are available as products of commerce from RBP Chemical Corporation, Milwaukee, Wisconsin. However, any conventional method of producing a developed image on a lithographic plate may be used. Three stock solutions were prepared. Solution (A) was composed of 93.5 weight percent water, and 6.5 weight percent active polymer component where the average molecular weight of the active polymer component was about 250,000, and about 12 percent of the carbonyl sites were occupied by carboxyl groups. Solution (B) was composed of 92 weight percent water and 8 weight percent active polymer component where the average molecular weight was about 250,000 and about 10 percent of the carbonyl sites were occupied by carboxyl groups. Solution (C) was composed of 90 weight percent water and 10 weight percent active polymer component with average molecular weight of about 180,000 and 25 percent carboxyl groups. The pH of each solution was adjusted to about 4.5 with 85 percent sulfuric acid.

To each stock solution were added varying amounts (tabulated below as weight percentages of the stock solution) of different additives. The resulting test solution (or dispersion) was examined for clarity. Each test solution (or dispersion) was applied to one or more test coupons, using paper tissues. The plates were then dried completely, using dry tissues. Cheesecloth may be substituted for the tissues with no change in result. The final drying stage was studied carefully for drag and stickiness. Some of the plates were stored at ambient temperature and humidity for differing time intervals, then inked and checked for scumming. As tabulated below, the quality of the plates protected by the solutions containing polyglycols of the present invention was equivalent to that of the control plates.

TABLE

| Run No. | Stock Solution | Additive Type | Average Molecular Weight | Concentration % | Solution Clarity | Amount of tackiness[5] | Scumming Test[6] 1 wk. | 1 mo. | 2 mos. | 3 mos. |
|---|---|---|---|---|---|---|---|---|---|---|
| 1* | A | None | (control) | | clear | ++ | 0 | 0 | + | — |
| 2* | B | None | (control) | | " | ++ | 0 | 0 | + | — |
| 3* | C | None | (control) | | " | + | 0 | 0 | 0 | 0 |
| 4 | A | GPE[1] | 2600 | 2.5 | " | + | — | — | — | — |
| 5 | A | GPE[1] | 2600 | 5 | " | 0 | 0 | 0 | + | — |
| 6 | C | GPE[1] | 2600 | 5 | " | 0 | 0 | 0 | 0 | 0 |
| 7 | A | GPE[1] | 2600 | 10 | " | 0 | — | — | — | — |
| 8 | B | PE[2] | 300 | 2.5 | " | + | — | — | — | — |
| 9 | B | PE[2] | 300 | 10 | " | 0 | — | — | — | — |
| 10 | B | PE | 400 | 5 | " | 0 | — | — | — | — |
| 11 | C | PE | 400 | 5 | " | 0 | 0 | 0 | 0 | 0 |
| 12 | A | PE | 600 | 2.5 | " | + | — | — | — | — |
| 13 | A | PE | 600 | 5 | " | 0 | 0 | 0 | + | — |
| 14 | B | PE | 600 | 5 | " | 0 | — | — | — | — |
| 15 | C | PE | 600 | 5 | " | 0 | 0 | 0 | 0 | 0 |
| 16 | A | PE | 600 | 10 | " | 0 | — | — | — | — |
| 17 | B | CP[3] | 260 | 2.5 | " | + | — | — | — | — |
| 18 | A | CP[3] | 260 | 5 | " | 0 | 0 | 0 | + | — |
| 19 | C | CP[3] | 260 | 5 | " | 0 | 0 | 0 | 0 | 0 |

TABLE-continued

| Run No. | Stock Solution | Additive Type | Average Molecular Weight | Concentration % | Solution Clarity | Amount of tackiness[5] | Scumming Test[6] 1 wk. | 1 mo. | 2 mos. | 3 mos. |
|---|---|---|---|---|---|---|---|---|---|---|
| 20 | B | CP | 700 | 2.5 | cloudy | + | — | — | — | — |
| 21 | B | CP | 700 | 10 | " | 0 | — | — | — | — |
| 22 | B | CP | 3000 | 10 | " | solvent effect | — | — | — | — |
| 23 | A | PP[4] | 250 | 2.5 | cloudy | + | — | — | — | — |
| 24 | A | PP | 250 | 10 | " | 0 | — | — | — | — |
| 25 | B | PP | 400 | 1.25 | " | + | — | — | — | — |
| 26 | B | PP | 400 | 2.5 | " | + | — | — | — | — |
| 27 | B | PP | 400 | 5 | " | 0 | — | — | — | — |
| 28 | C | PP | 400 | 5 | " | 0 | 0 | 0 | 0 | 0 |
| 29 | B | PP | 400 | 10 | " | slight solvent effect | — | — | — | — |
| 30* | B | PP | 1200 | 2.5 | " | solvent effect | — | — | — | — |
| 31* | B | PP | 2000 | 10 | " | solvent effect | — | — | — | — |
| 32* | B | glycerine | 92 | 10 | clear | ++ | — | — | — | — |
| 33* | B | ethylene glycol | 62 | 10 | " | ++ | — | — | — | — |

[1]GPE indicates a triether of glycerine with propylene and ethylene oxides
[2]PE indicates polyethylene glycol
[3]CP indicates a triether of glycerine with propylene oxides
[4]PP indicates polypropylene glycol
[5]++ indicates considerable drag was encountered; + indicates drag was considerably reduced; 0 indicates drag was virtually non-existent
[6]These are indications of the amount of scumming observed upon inking a plate treated with the composition of the example stored for the indicated period of time. 0 indicates no scumming; + indicates some dot scumming; and — indicates no plates were examined after that period of storage.
*Comparison run not illustrative of the practice of this invention

EXAMPLE 34

A solution was made up containing (1) 5 weight percent of an acrylic acid/acrylamide copolymer, where 12 percent of the copolymer was acrylic acid and had an average molecular weight of about 250,000; (2) about 2.5 weight percent of an acrylic acid/acrylamide copolymer, where the copolymer was 50 percent acrylic acid, and had an average molecular weight of about 25,000; (3) 5.0 weight percent of a triether of glycerine with a mixture of polypropylene and polyethylene oxides, said triether having an average molecular weight of about 2500; and (4) about 87.5 weight percent tap water. The pH was adjusted to 4.5, using sulfuric acid or sodium hydroxide, as necessary. This solution was sent to a commercial printer for testing under typical pressroom conditions, on a full-size lithographic plate. The printer reported that no tackiness was observed when the solution was applied to the plate and dried, and that no sensitization of the plate occurred after storage for at least 72 hours.

I claim:

1. An imaged lithographic printing plate which has been treated with a composition comprising (1) water, (2) an active polymer component for rendering non-image areas of the plate hydrophilic, the active polymer component being selected from the group consisting of
    (a) a polyacrylamide-based polymer wherein from about 3 to about 70 percent of the carbonyl sites are carboxyl groups, and the balance of said sites are amide moieties,
    (b) a physical blend comprised of from about 97 to about 30 weight percent polyacrylamide and from about 3 to about 70 percent polyacrylic acid or an alkali metal or ammonium salt thereof,
    (c) a physical blend comprised of polyacrylamide, or polyacrylic acid or an alkali metal or ammonium salt thereof, and at least one polyacrylamide-based polymer as described in (a), said polymers being employed in proportions such that of the total carbonyl sites present in the blend, from about 3 to about 70 percent are carboxyl groups and the balance are amide moieties,
    (d) a mixture of any two or more of the foregoing (a)-(c),
the weight average molecular weight of each of said polyacrylamide-based polymer, polyacrylamide, and polyacrylic acid or salt thereof being in the range of from about 5000 to about 1,000,000, and
    (e) a co-mixture of one or more of the foregoing (a)-(d) with up to about 30 weight percent hydroxypropyl methylcellulose based on the total weight of the comixture, said hydroxypropyl methylcellulose being of a type which produces a 2 weight percent aqueous solution having a viscosity of from about 1 to about 100 cP when measured according to ASTM Method D 2363-72; and
(3) a polyoxyalkylene glycol in an amount which is effective to reduce tackiness while the treated plate is being dried, and which does not adversely affect the printing properties of said plate, said polyoxyalkylene glycol being selected from the group consisting of (a) a polyoxyethylene glycol with an average molecular weight of about 200 to about 800, (b) a polyoxypropylene glycol with an average molecular weight of about 200 to about 600, (c) a mixture of components from (a) and (b), (d) a triether of glycerine with a mixture of polypropylene and polethylene oxides, and (e) a triether of glycerine with polypropylene oxides.

2. The treated plate of claim 1 wherein the polyoxyalkylene glycol is item (a) and has a molecular weight of from about 300 to about 600.

3. The treated plate of claim 1 wherein the polyoxyalkylene glycol is item (b) and has a molecular weight of from about 250 to about 400.

4. The treated plate of claim 1 wherein the polyoxyalkylene glycol is item (c) and the components of said mixture are selected from polyoxyethylene glycol with a molecular weight of from 300 to about 600 and polyoxypropylene glycol with a molecular weight of from about 250 to about 400.

5. The treated plate of claim 1 wherein the polyoxyalkylene glycol is item (d) and has a molecular weight of about 2,500.

6. The treated plate of claim 1 wherein the polyoxyalkylene glycol is item (e) and has a molecular weight of about 250.

7. In the method of treating imaged lithographic printing plates wherein an aqueous solution of a synthetic desensitizing gum is applied to said plates and then dried, the improvement which comprises: employing as said solution a composition comprising (1) water, (2) an active polymer component for rendering non-image areas of the lithographic plate hydrophilic, said active polymer component being present in an amount of from about 3 to about 30 weight percent active polymer component, based on the weight of the active polymer component and the water, and active polymer component being selected from the group consisting of (a) a polyacrylamide-based polymer wherein from about 3 to about 70 percent of the carbonyl sites are carboxyl groups, and the balance of said sites are amide moieties, (b) a physical blend comprised of from about 97 to about 30 weight percent polyacrylamide and from about 3 to about 70 percent polyacrylic acid or an alkali metal or ammonium salt thereof, (c) a physical blend comprised of polyacrylamide, or polyacrylic acid or an alkali metal or ammonium salt thereof, and at least one polyacrylamide-based polymer as described in (a), said polymers being employed in proportions such that of the total carbonyl sites present in the blend, from about 3 to about 70 percent are carboxyl groups and the balance are amide moieties, (d) a mixture of any two or more of the foregoing (a)–(c), the weight average molecular weight of each of said polyacrylamide-based polymer, polyacrylamide, and polyacrylic acid or salt thereof being in the range of from about 5000 to about 1,000,000, and (e) a co-mixture of one or more of the foregoing (a)–(d) with up to about 30 weight percent hydroxypropyl methylcellulose based on the total weight of the comixture, said hydroxypropyl methylcellulose being of a type which produces a 2 weight percent aqueous solution having a viscosity of from about 2 to about 100 cP when measured according to ASTM Method D 2363-72; and (3) a polyoxyalkylene glycol in an amount which is effective to reduce tackiness while the composition is drying and which does not adversely affect the printing properties of a plate treated with said composition, said polyoxyalkylene glycol being selected from the group consisting of (a) a polyoxyethylene glycol with an average molecular weight of about 200 to about 800, (b) a polyoxypropylene glycol with an average molecular weight of about 200 to about 600, (c) a mixture of components from (a) and (b); (d) a triether of glycerine with a mixture of polypropylene and polyethylene oxides, and (e) a triether of glycerine with polypropylene oxides.

8. The method of claim 7 wherein said polyoxyalkylene glycol is present in a concentration of at least about 1 percent.

9. The method of claim 8 wherein the concentration of said polyoxyalkylene glycol is about 5 percent.

10. The method of claim 7 wherein said aqueous solution is, after application, dried with an absorbent material.

11. The method of claim 7 wherein the polyoxyalkylene glycol is item (a) and has an average molecular weight of from about 300 to about 600.

12. The method of claim 11 wherein the concentration of said polyoxyalkylene glycol is at least about 1 percent.

13. The method of claim 12 wherein the concentration of said polyoxyalkylene glycol is about 5 percent.

14. The method of claim 11 wherein said aqueous solution is, after application, dried with an absorbent material.

15. The method of claim 7 wherein the polyoxyalkylene glycol is item (b) and has an average molecular weight of from about 250 to about 400.

16. The method of claim 15 wherein said polyoxyalkylene glycol is present in a concentration of at least about 1 percent.

17. The method of claim 16 wherein the concentration of said polyoxyalkylene glycol is about 5 percent.

18. The method of claim 15 wherein said aqueous solution is, after application, dried with an absorbent material.

19. The method of claim 7 wherein the polyoxyalkylene glycol is item (c) and the components of said mixture are selected from polyoxyethylene glycol with an average molecular weight of from about 300 to about 600 and polyoxypropylene glycol with an average molecular weight of from about 250 to about 400.

20. The method of claim 19, wherein the concentration of said mixture of polyoxyalkylene glycols is at least about 1 percent.

21. The method of claim 20, wherein the concentration of said mixture of polyoxyalkylene glycols is about 5 percent.

22. The method of claim 19, wherein said aqueous solution is, after application, dried with an absorbent material.

23. The method of claim 7 wherein the polyoxyalkylene glycol is item (d) and has an average molecular weight of from about 2000 to about 3000.

24. The method of claim 23 wherein said polyoxyalkylene glycol is present in a concentration of at least about 1 percent.

25. The method of claim 24 wherein the concentration of the polyoxyalkylene glycol is about 5 percent.

26. The method of claim 23 wherein said aqueous solution is, after application, dried with an absorbent material.

27. The method of claim 23, wherein the average molecular weight of said polyoxyalkylene glycol is about 2500.

28. The method of claim 27 wherein said polyoxyalkylene glycol is present in a concentration of at least about 1 percent.

29. The method of claim 28 wherein the concentration of the polyoxyalkylene glycol is about 5 percent.

30. The method of claim 29 wherein said aqueous solution is, after application, dried with an absorbent material.

31. The method of claim 27, wherein said aqueous solution is, after application, dried with an absorbent material.

32. The method of claim 7 wherein the polyoxyalkylene glycol is item (e) and has an average molecular weight of from about 200 to about 750.

33. The method of claim 32 wherein the average molecular weight of said polyoxyalkylene glycol is about 250.

34. The method of claim 33, wherein said polyoxyalkylene glycol is present in a concentration of at least about 1 percent.

35. The method of claim 34 wherein the concentration of said polyoxyalkylene glycol is about 5 percent.

36. The method of claim 35 wherein said aqueous solution is, after application, dried with an absorbent material.

* * * * *

UNITED STATES PATENT AND TRADEMARK OFFICE
CERTIFICATE OF CORRECTION

PATENT NO. : 4,246,843
DATED : January 27, 1981
INVENTOR(S) : Walter L. Garrett

It is certified that error appears in the above—identified patent and that said Letters Patent is hereby corrected as shown below:

In the Table in Col. 9, Run No. 24, under the column "Type", delete "PP" and insert --$PP^4$--.

Col. 11, line 21 of Claim 7, delete the word "and" second instance, and insert the word --the-- before "active".

Col. 11, line 51 of Claim 7, delete the figure "2" and insert --1--.

Signed and Sealed this

Seventh Day of July 1981

[SEAL]

Attest:

RENE D. TEGTMEYER

Attesting Officer      Acting Commissioner of Patents and Trademarks